Dec. 17, 1935.  D. W. LOSEE  2,025,000
REGENERATED CELLULOSE SHEET OR FILM AND METHOD OF MAKING SAME
Filed Aug. 1, 1933
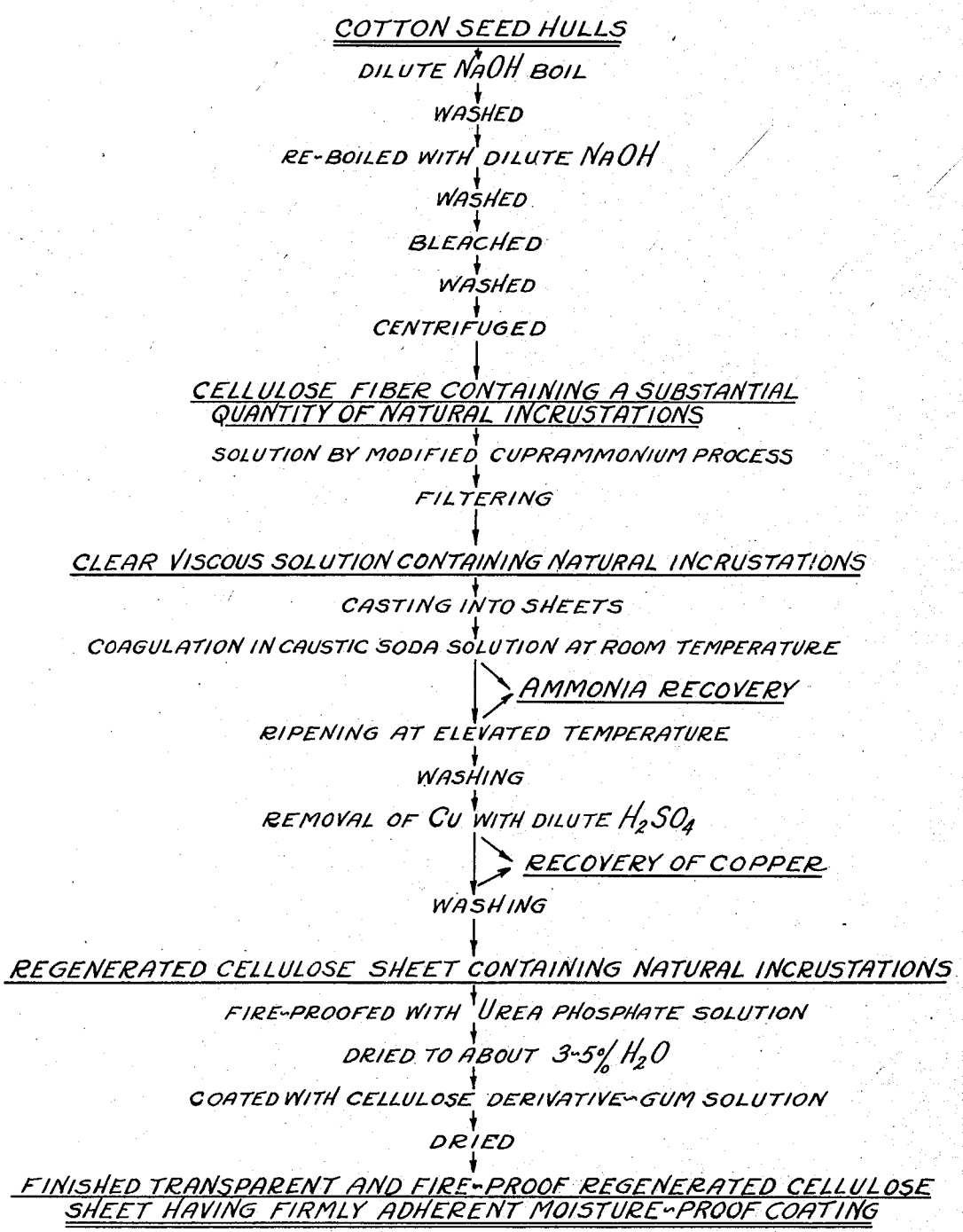
INVENTOR.
DANIEL W. LOSEE
BY Moses & Nolte
ATTORNEYS.

Patented Dec. 17, 1935

2,025,000

UNITED STATES PATENT OFFICE 2,025,000

REGENERATED CELLULOSE SHEET OR FILM AND METHOD OF MAKING SAME

Daniel W. Losee, East Patchogue, N. Y., assignor to Johnson-Losee Corporation, Long Island City, N. Y., a corporation of New York Application August 1, 1933, Serial No. 683,229

12 Claims. (Cl. 91—68)

The present invention relates to improvements in the manufacture of transparent sheets or film having a regenerated cellulose base. In general it is the object to improve existing types of this material whereby it will be adapted for a wider variety of uses, as for example for photographic purposes. It is also an object of my invention to produce a fire-proof or fire-resisting film or sheet by employing a fire-proofing agent which heretofore has not been used for this purpose. It is also an object to produce film or sheets which are not only superior to existing types but which can be produced at a saving in cost. One means by which I achieve a lower cost of manufacture is by the use of lower grades of cellulosic material, as for example cotton seed hulls or husks which I have discovered can, by proper treatment, be used to produce a regenerated cellulose which has exceptional qualities for the present purposes. As is well known, regenerated cellulose sheets are affected by moisture and heretofore it has been proposed to coat such sheets with a lacquer containing waxes. I have discovered that by utilizing the incrustations or wax-like or resinous substances naturally present in the cotton fiber or cotton hulls for example, it is possible to dispense entirely with the use of wax in the coating material. Because of the absence of wax on the outer surface of the film or sheet, the coating is not as sensitive to higher temperatures, especially in the presence of water vapors, and a better surface is afforded for the adherence of other films such as gelatine containing a light sensitive emulsion.

In carrying out my invention, after the cellulose containing a desired portion of the naturally present water insoluble incrustations has been suitably purified, it is then brought into solution. While my invention broadly contemplates the use of any suitable means of solution, I have to date obtained superior results by using the so-called cuprammonium method of solution, and without wishing to be bound by any theory by which my result is accomplished I ascribe the superior action of the cuprammonium process over others such as the viscose process, for example, to the fact that the process used does not decompose or remove substantially the natural waxes and resins in the cellulose fiber. In my use of the cuprammonium process I have found it desirable to make certain changes from such processes as heretofore practiced which I believe to be novel and to be responsible in part for my superior results. A further advantage of the use of the improved cuprammonium process is that the cellulose solutions are relatively stable and may be kept for long periods of time, in contrast to the viscose method, for example, in which the sodium xanthate cellulose solution must be aged or ripened with great exactness or otherwise the sheets formed therefrom are of inferior quality. Furthermore, in the cuprammonium process as I employ it, the solution is effected with great rapidity and also the recovery of the starting materials, as for example the ammonia and the copper salts, is relatively complete, thereby making for very economical operation.

The cellulose containing the correct amount (say, at least, 3% thereof) of the natural incrustations having been brought into solution, the next step is to cast the film or sheets. This may be done by known means, after which the copper and ammonia are recovered from the cast cellulosic material. In adapting the cuprammonium process for my purpose I have devised special conditions under which the coagulation of the cellulose takes place, all of which will be disclosed in greater detail hereinafter and which contribute to the successful operation of the process.

After the film has been regenerated by removing the ammonia and copper from the cellulose, the film is impregnated with the fire-proofing agent and then dried. While regenerated cellulose films are not explosively inflammable as is celluloid yet they burn with sufficient ease to constitute a fire hazard, particularly when used as the base for motion picture film. Moreover, for other purposes even as a wrapping material the inflammability of the regenerated cellulose film is considerable so that the fire-proofing of this material is a matter of considerable value and importance. Because of its ease in applying, it has been my endeavor to provide a water soluble fire-proofer which, however, would in no wise impair the transparency of the film or sheet and yet have the necessary effectiveness. After much experimentation I have discovered the urea phosphates, preferably the orthophosphates, to be extremely well suited for the purpose and to be not only remarkably effective as a fire-proofing agent, but also to function as a plasticizer. After the film has been impregnated with an aqueous solution of the fire-proofer, it is then dried, after which the water-proofing coat is applied. I have found that in the drying step it is essential that the proper quantity of moisture be left in the film, which amount I found to be in the neighborhood of 3 to 5% based on the weight of the film.

The film having been dried to the extent indicated, it is then coated with a suitable lacquer which may be of a relatively simple composition consisting of a solvent, a cellulose derivative base, as for example cellulose nitrate, and a gum or resin such as gum dammar. As a solvent I prefer to use a mixture of a major portion of acetone and a minor portion of amyl acetate or an equivalent high boiler but various other solvents may be used and I do not regard the selection of particular solvents as critical, regard being had to standard practice in the cellulose lacquer art. The use of waxes in the lacquer is unnecessary. The retention of from 3 to 5% of moisture also assists in causing the coating to adhere to the cellulose base. My explanation for this is as follows: When the film contains a few per cent of moisture, its surface is somewhat rough and of open texture which permits the lacquer to penetrate into the fiber and thus to adhere more firmly. When part of this moisture escapes along with the lacquer solvents during the drying operation the surface particles contract somewhat, thereby strengthening the union of the lacquer and regenerated cellulose. Starting with a film containing from three to five per cent moisture, it is found that the moisture content will fall approximately one per cent during the drying of the coating. One advantage of the improved coated film is that the moisture can be reduced to as little as two per cent without impairing substantially its flexibility, this result being considered due in large part to the combined plasticizing qualities of the urea phosphate and the natural waxes. The ability of the improved film of maintaining its flexibility with such a low moisture content permits it to be used under a wide variety of climatic conditions without the use of special precautions. The amount of moisture in the regenerated film before lacquering is susceptible to a somewhat greater value than five per cent, particularly if more severe drying conditions are used in the drying step following the application of the lacquer. If, however, the content of moisture be too great the factor of shrinkage of the film upon drying will be inconvenient. The amount of moisture in the film varies somewhat with atmospheric conditions, but such variation as normally occurs is insufficient to interfere with the intended uses of the film. A further factor which I believe promotes this adherence is that the naturally present waxes and resins act as a binder for the cellulose derivative coating since they are both bound to the cellulose base material and are soluble in the cellulose derivative coating.

The film is water resistant to the extent that it can be used for photographic purposes and developed without swelling or shrinking to an amount which will interfere with the proper use of the film in the projector. It is highly transparent, flexible, strong, fire-proof, and colorless, and retains these qualities when used for photographic purposes.

In the annexed drawing I have shown a diagram or so-called flow sheet of a specific example of the process illustrative of my invention, of making a water-proof film from cotton seed hulls.

The following is a detailed description of the example outlined in the flow sheet:

Preparation of fiber

*Caustic soda treatment.*—Cotton seed hulls (press cake) containing sixty-five to seventy per cent cellulose fiber, are boiled for two hours with a two per cent caustic soda solution at five pounds pressure, using one gallon of the solution to one pound of cotton seed hulls. The solid material is then separated from the used liquor, washed until the washings are colorless or nearly so, and the fibers then centrifuged. The fibers thus treated are then subjected to a second soda boil for one-half hour using a fresh solution of two per cent caustic soda. The used liquor from this step is preferably used in the first soda boil. The material is then washed, first with hot, then with cold water.

*Bleaching.*—The thus purified fibers are now bleached, for which I employ preferably a solution of sodium hypochlorite which may be formed in the following manner: To one pound of chlorinated lime $CaCl(OCl).H_2O$ in one gallon of water is added two pounds soda ash and the mixture boiled for two minutes, after which the resulting sodium hypochlorite solution is separated from the formed calcium carbonate by filtration, and the filter being washed with enough hot water to restore the original volume. In use, one part of sodium hypochlorite solution is diluted with seven to nine parts of water according to the grade of raw material and then employed in the amount of one gallon of the diluted liquor to one pound of cotton fiber. The bleaching operation is carried out at a moderate temperature preferably not exceeding 40° C. and continued for about three hours.

*Washing and drying.*—When the fiber has acquired a bluish-white appearance it is washed in water until it is free from odor and is without alkaline reaction. This washing may be followed by a dilute hydrochloric acid wash for the purpose of whitening the product still further by removing the iron that may be present. If possible, the acid wash should be avoided as the acid decomposes certain natural magnesium soaps comprising the natural incrustations, which soaps are preferably retained. The acid wash however seems to result in the fiber keeping longer in storage. If it is intended to store the fiber it is dried at 60° C. until the moisture content is reduced to about 5%; if, however, the fiber is to be dissolved, a greater amount of moisture may be left in and drying with heat omitted. The fiber containing more or less water is now ready for the step of solution making. The use of the still wet cellulose for solution making is preferred since it is found that the drying of the fibers hinders the complete re-swelling thereof during the subsequent treatment.

It will be understood that the treatment thus far described acts to preserve the necessary quantity of the insoluble incrustations in the fiber.

Dissolving the cellulose

The prepared cellulose preferably undried from the purifying steps is first drenched with ammonia of 26 Bé., preferably in the proportion of 100 pounds of cellulose (dry weight) to 333⅓ pounds of ammonia (26 Bé.) whereupon 78½ pounds copper hydroxide, $Cu(OH)_2$ and 24⅔ gallons of water are added. By the use of this method a relatively concentrated solution of cellulose, e. g., 16%, may be obtained. Instead, however, of proceeding in the manner described, even better results are obtained by the use of the following method:

25 pounds copper sulphate $CuSO_4.5H_2O$ are dissolved in 45 pounds of ammonium hydroxide of 26 Bé. whereupon 12½ pounds of the purified cotton fiber are added. Then eight pounds sodium hydroxide in 15 pounds of water are added, whereupon solution of the fiber takes place at once, such solution containing usually about 16% of cellulose. This solution is then filtered in a filter press or through sand and passed to a storage tank. Bubbles are removed either by allowing the solution to stand or by application of slight vacuum. It will be noted that this last described method of dissolving the cotton has the advantage of not employing copper hydroxide which it is necessary to prepare by reaction of a soluble copper salt, usually the sulphate, with caustic soda followed by filtration of the cupric hydroxide, an operation of some difficulty.

While not absolutely necesasry, somewhat better results are achieved in the soda boils by the presence of catalysts which are prepared from sea salt preferably as follows:

*First method.*—10 grams sea salt are dissolved in 75 cc. 5% $HNO_3$ solution, evaporated until nearly dry, then cooled and allowed to crystallize, the crystals filtered off and slightly washed.

*Second method.*—Same procedure is followed, except that sulphuric acid is used instead of nitric acid and the calcium sulphate formed is filtered off before evaporation.

Preferably 25 grams per 100 pounds of cotton of the product of method #1 are added during the first soda boil, and 10 grams per 100 pounds of cotton of the product of method #2 are added during the second soda boil.

Film casting

The film is cast using known apparatus preferably consisting of a slowly rotating casting wheel or endless belt on which the cellulose solution is spread using an orifice of known width. After the liquid has flowed out upon the wheel in this manner, continued rotation of the wheel carries the freshly formed film into the coagulating bath containing, for example, from 20 to 30 parts caustic soda per 100 parts of water. Immersion in this bath is maintained for approximately four minutes at room temperature, i. e., up to 30° C., after which that portion of the wheel containing the coagulated film leaves the coagulating bath, whereupon the film is strong enough to be stripped from the wheel. When using a casting wheel the surface upon which the solution is poured has been previously wet with the coagulating solution so that coagulation of the portion of the film next to the wheel begins at once and the film is prevented from sticking to the wheel. The film is then conveyed to an aging bath of a strength which may be the same as that of the coagulating bath and maintained at a temperature from 40 to 65° C. The time of immersion in this bath varies chiefly with the thickness of the film. By casting the film at a comparatively low temperature, the formation of air bubbles in the film is avoided, while by the use of the subsequent higher temperature the coagulating time remains low and the flexible features of the ultimate product are advanced. Thus, the aging of the film of .004 inch ultimate thickness may be completed within twenty minutes from the time of casting. The film is then washed with cold water, for which five minutes is usually sufficient time, and the copper removed by the use of preferably an acid solution consisting of 5 Bé. sulphuric acid. A slight quantity of sea salt may be added to the acid for the purpose of accelerating the decoloration. The removal of the copper from the film is complete when the last trace of color is removed. Following this the film is washed in cold water for a period on the order of fifteen minutes.

Fire proofing

The film is now passed through a fire-proofing bath consisting of a solution of approximately from 4 to 7% of urea phosphate in water. In this bath the film requires about three minutes for impregnation. The thus impregnated film is now dried at a temperature preferably not exceeding 70° C. and so as to leave in the film preferably from 3 to 5% of water. The regenerated cellulose film thus formed, containing from 1.8 to 2% of the fire-proofer, depending upon the thickness of the film, is now ready for the coating step.

Coating

For this purpose preferably the following lacquer is used: acetone 75 pounds, amyl acetate 15 pounds, pyroxylin 3 pounds, gum dammar or other resin 3 pounds. This solution is placed in a bath through which the film is caused to pass after which the thus coated film is dried for approximately three minutes at a moderate heat, say 50° C.

For photographic purposes the regenerated cellulose base will be of .004 inch thickness approximately, while for use as a wrapping material the thickness can be on the order of .001 to .002 or higher, up to 12/1000″, depending on the intended use. The pyroxylin coating may vary from .0001 to .001″, preferably being used thinner on the wrapping material than on the photographic film. For photographic purposes the film is now ready for the gelatine light sensitive emulsion preceded by the application of the so-called sub-stratum, if necessary, as is customary in the art of coating film with photographic emulsion.

Recovery of materials

The ammonia is given off in the coagulating and aging tanks, and is removed by means of a suction fan (the tanks being closed) and recovered in accordance with the standard ammonia recovery practice. For the purpose of recovering the copper the decolorizing bath, after it has become exhausted, is preferably filtered and pumped into tanks where the copper is precipitated as copper hydroxide with caustic soda. This puts the copper in the form in which it is to be used, in the first solution method above given, namely, as copper hydroxide. Where the copper is to be used in the form of sulphate, as in the second method given, the sulphuric acid solution containing the copper is simply evaporated until the copper sulphate crystallizes out.

Because of the natural water-proof qualities of the regenerated cellulose film containing the residual waxes and resins, the nature of the coating does not appear to be critical so that a variety of types of lacquer may be employed. Because of its cheapness I prefer to use a lacquer having a pyroxylin base and containing a simple gum, but other cellulose derivatives such as various types of the cellulose ethers may be used with a suitable gum, if desired. In lieu of gum dammar I may use gum copal, mastic, ester gum, or various of the synthetic resins. For some purposes it is possible to apply a coating containing waxes to the film if desired, but I have found the use of such a wax-containing coating to be undesirable.

My improved film is not only moisture-proof, thereby adapting it for use as a wrapping material, but it is further unaffected by water to such an extent that it is adapted for use as a base for photographic film, as for example, motion picture film. Heretofore many attempts have been made to utilize regenerated cellulose as the base of motion picture film but these attempts have not been successful. One reason for this non-success is the distortion undergone by the regenerated cellulose upon being wetted in the developing, washing and fixing baths. Another reason has been the failure of the moisture-proof coating to adhere firmly to the base. In cases where the regenerated cellulose has been successfully water-proofed for the purposes of making a wrapping material, such sheets have been unsuited as a base for photographic film because of inability of the gelatine emulsion to adhere thereto. Owing to the absence of wax in the coating of my film it can be coated with a light sensitive gelatine emulsion of silver salts by usual methods without difficulty. Moreover, because of the presence of the fire-proofer, the improved film is non-inflammable. Application of heat to the film causes it to char rather than to burn, and, furthermore, such charring takes place without liquefaction of the film such as occurs when acetate film is heated. Furthermore, the gases produced by the combustion are relatively non-toxic in contrast to the poisonous character of the gases produced by the burning of nitrate and acetate films.

In carrying out the process various departures may be made from the details given and satisfactory results produced. Thus, while because of their cheapness and peculiar adaptability for the purpose I prefer the use of cotton seed hulls, cotton linters or other cotton fibers may also be used upon modifying the preliminary treatment of these slightly where necessary. Thus far, I have achieved satisfactory results using cotton cellulose material having a cellulose content as low as 50% and as high as 91%. When using cotton cellulose of great purity such as represented by the higher percentage of cellulose given, the preliminary soda boils will be less severe and one boil only may be used.

The quantity of the natural incrustations in ordinary cotton fibers varying as a rule from 3 to 5% is sufficient to impart the desired moisture-proofing and flexible qualities to the film. Further, while for most purposes I prefer to fireproof the film as described, yet for uses where the combustibility of the regenerated film is without consequence, the fire-proofing step may be omitted.

Thus far I have found urea phosphate to be greatly superior to all other water soluble fire-proofing salts, particularly ammonium salts, which, to my knowledge, have heretofore been proposed. Thus I have found that such ammonium salts as have been used for fire-proofing various materials crystallize too easily when applied to the film either at the time the film is dried or else after a period of a few days or weeks. Other ammonium salts otherwise suited for fire-proofing have the effect of rendering the film brittle and dark after a short period. Urea phosphate while having fire-proofing qualities equal or superior to those of the fire-proofers heretofore proposed has none of the disadvantages of such proposed fire-proofer and in addition may be employed in very dilute solutions, i. e., as low as 3½% while yielding satisfactory results. Moreover, it also acts along with the naturally present incrustations, as a plasticizer in the film. In addition to urea phosphate, I have also found that sodium thiosulfate functions well but this substance has the drawback of giving rise to very disagreeable odors when the film is decomposed by heat.

I have found the solution of the cellulose by means of the cuprammonium process to be of particular value because it preserves in the cellulose the necessary quantity of the natural incrustations, but I may use any other method of solution so long as these incrustations are sufficiently retained to function in the desired manner.

The process of dissolving the cellulose by first dissolving a copper salt in ammonia and then adding the cotton, after which a caustic soda solution is added, is not claimed herein but is the subject of a separate application filed by Werner Kleinicke, on August 1st, 1933, now Patent 1,972,098 issued Sept. 4, 1934.

It is understood that the natural incrustations of the cotton fibers, both seeds and hulls, owe their wax-like properties chiefly to certain higher alcohols (waxes) such as gossyphyl alcohol and montanyl alcohol together with lesser quantities of acid esters, glycols, etc. They further include magnesium soaps of certain fatty acids, which soaps sometimes amount to ½ of 1% of the weight of the cotton in the untreated state. The exact composition of the incrustations is not known, however, and undoubtedly varies with different cottons. By the term "incrustation" in the claims it is intended to cover these wax-like or other insoluble compounds which are found naturally occurring in cotton and fibers of like nature and which contribute in the final product to the water-proofing qualities and flexibility thereof, irrespective of the particular chemical composition of such incrustations or the manner of their occurrence in the fiber.

By "water-proof" I mean the ability of my improved regenerated and lacquered cellulose sheets to withstand the effect of water as liquid in contact therewith without deterioration for periods of time several times as great as is the case with similar lacquered sheets of regenerated cellulose now manufactured by others. Thus, sheets of my improved coated material of the thickness of wrapping material, i. e. of approximately one thousandth of an inch or more have withstood the effect of water as drops at room temperature (up to 40° C.) for a period of at least forty-eight hours without any noticeable deterioration or separation of the lacquer coatings. In the case of the prior art, so-called moisture-proof sheets used for wrapping cigarettes, for example, show marked deterioration after contact with a drop of water over a period of an hour or less. This deterioration manifests itself by a swelling or blistering of the sheet, the cause of which is the swelling of the cellulose base due to water which has penetrated the lacquer coating, and to the presence of the excess of water under the coating after the saturation of the base. Either this swelling of the base, or its distortion incident upon the subsequent drying thereof, results, in most cases, in the rupture of the lacquer coatings on both sides and hence in the total destruction of the moisture-proof quality of the sheet. In the case of applicant's product, on the other hand, such blistering does not develop even after prolonged contact with drops of water, and this action may be explained by the fact that not only does applicant's regenerated cellulose base have greater water resistant qualities by reason of the retained incrustations but the presence of such incrustations causes a much firmer bond between the base and the lacquer coatings.

The complete process describing the various steps set forth is believed to produce a most effective waterproof film for use as a base for photographic film or for other purposes. As will be apparent, however, some of the steps of the process described are of utility independently of the complete process. For instance, the preparation of the cellulose while retaining in it some or all of the non-soluble incrustations possesses potential advantages for other purposes than the manufacture of film, such for example for the preparation of textile fibers. The improved methods of preparing cuprammonium solutions of cellulose are also capable of employment in the manufacture of rayon, or for other purposes. The method of fire-proofing and the use of the fire-proofing agent specified, urea phosphate, is also applicable to the fire-proofing of cellulose products of many kinds.

I claim:—

1. An article of manufacture comprising a substantially transparent sheet or film of regenerated cotton cellulose combined with a water resistant, transparent, flexible, non-tacky coating, said regenerated cellulose containing sufficient of the natural incrustations so as to render the article water-proof without the presence of added waxes in the coating.

2. The article of manufacture according to claim 1 in which the natural incrustations are left in the fiber to the extent of at least .3 of 1% thereof.

3. The method of making a transparent, flexible, water-resistant sheet or film which comprises alkalizing raw cotton cellulose material and then bleaching the same, such steps being carried to a point where the material is rendered colorless but so as to leave substantially unattacked part of the naturally occurring incrustations, dissolving the cellulose so prepared in a cuprammonium solution, and then casting the film, coagulating the same and removing therefrom the ammonia and copper and then drying and coating with a water-resistant coating, such retained incrustations being sufficient to render the coated sheet water-proof without the presence of added waxes in the coating.

4. As an article of manufacture a substantially transparent sheet or film of regenerated cellulose derived from raw cotton cellulose material having a cellulose content between 50 and 91%, said sheet being combined with a water resistant, transparent, flexible, non-tacky coating, said regenerated cellulose containing sufficient of the natural cotton incrustations so as to render the article water-proof without the presence of added waxes in the coating.

5. The method according to claim 3 in which the film before coating contains from 3 to 5% of water.

6. The method of manufacturing transparent films or sheets of cellulose comprising purifying raw cotton fiber so as to leave a substantial proportion of the natural incrustations therein, dissolving same by the cuprammonium method, forming the mixture into transparent, regenerated cellulose sheets, impregnating the cellulose sheet with an aqueous solution of a water soluble, transparent fire-proofer, drying and then locking in the fire-proofer by coating the dried sheet containing the proper amount of moisture with a suitable transparent, flexible, water-resistant film.

7. An article of manufacture comprising a sheet or film of regenerated cellulose impregnated with urea phosphate and having a water resistant, transparent, flexible, non-tacky coating.

8. An article of manufacture comprising a sheet or film of regenerated cellulose impregnated with urea phosphate and containing from 3 to 5% of moisture and having a water resistant, transparent, flexible, non-tacky coating.

9. In the art of making cellulose sheets, the method of preparing cotton seed hulls for solution which consists in boiling the hulls in approximately 2% of alkali under slight super-atmospheric pressure not exceeding six pounds for about two hours, then washing, repeating the alkali boil for a shorter time and then bleaching to the point where the color disappears and then dissolving the thus treated cellulose in cuprammonium solution whereby a substantial portion of the natural incrustations of the cellulose fiber is retained by said solution.

10. The method of rendering cellulose articles fire-proof which consists in impregnating them with urea phosphate.

11. The method of increasing the water-resistant qualities of regenerated cellulose which comprises so treating the cellulose as to purify and bleach same while retaining a portion of the natural incrustations of the cellulose fiber, dissolving the so treated cellulose so as to retain a substantial portion of the incrustations, casting the dissolved cellulose and regenerating same, whereby such regenerated cellulose contains sufficient of the said incrustations so as to render the cellulose water-proof upon coating same with a simple pyroxylin coating containing no waxes.

12. An article of manufacture comprising a sheet or film of regenerated cotton cellulose combined with a water resistant, transparent, flexible, non-tacky coating, said regenerated cellulose containing sufficient of the natural incrustations so as to render the article water-proof without the presence of added waxes in the coating, said article containing urea phosphate as a fire-proofer.

DANIEL W. LOSEE.